(12) United States Patent
Kamijo et al.

(10) Patent No.: US 6,183,567 B1
(45) Date of Patent: Feb. 6, 2001

(54) GRAFFITI REMOVING METHOD

(75) Inventors: Tatsuyuki Kamijo, Chofu; Katsuyuki Miyasato; Hideo Tateno, both of Tokyo, all of (JP)

(73) Assignee: Sho-Bond Corporation, Tokyo (JP)

( * ) Notice: Under 35 U.S.C. 154(b), the term of this patent shall be extended for 0 days.

(21) Appl. No.: 09/181,885

(22) Filed: Oct. 29, 1998

(30) Foreign Application Priority Data

Oct. 31, 1997 (JP) .................................................. 9-314579

(51) Int. Cl.$^7$ ...................................................... B08B 7/00
(52) U.S. Cl. ................................ 134/4; 134/38; 510/174
(58) Field of Search ........................... 134/4, 38; 510/174

(56) References Cited

U.S. PATENT DOCUMENTS

| | | | | |
|---|---|---|---|---|
| 4,306,990 | * | 12/1981 | Goodman et al. | 252/174.15 |
| 4,353,745 | * | 10/1982 | Ebbeler | 106/2 |
| 4,923,755 | * | 5/1990 | Witucki | 428/447 |
| 4,929,691 | * | 5/1990 | Fillmore et al. | 525/477 |
| 4,929,703 | * | 5/1990 | Narula et al. | 528/23 |
| 5,134,197 | * | 7/1992 | Yamamori et al. | 525/100 |
| 5,387,434 | * | 2/1995 | Black | 427/154 |
| 5,426,151 | * | 6/1995 | Brandt et al. | 525/100 |
| 5,631,042 | * | 5/1997 | Becker et al. | 427/154 |
| 5,910,369 | * | 6/1999 | Macris et al. | 428/423.1 |
| 5,910,535 | * | 6/1999 | Smith | 524/588 |
| 5,929,005 | * | 7/1999 | Smith | 510/174 |

FOREIGN PATENT DOCUMENTS

0816452 * 1/1998 (EP) .
2747325 * 10/1997 (FR) .

* cited by examiner

*Primary Examiner*—Zeinab El-Arini
(74) *Attorney, Agent, or Firm*—Bacon & Thomas

(57) ABSTRACT

A graffiti removing method including the steps of: applying a solvent condensation type silicone resin coating composition having water repellency onto a surface of a base material of a structure through a primer layer to form an adhesion-resistant surface layer on the primer layer; applying a releasable coating composition onto the surface layer to form a releasable layer, after graffiti are written onto the surface layer; and releasing the releasable layer from the surface layer after the releasable layer is hardened to thereby remove the graffiti together with the releasable layer from a surface of the surface layer, whereby although graffiti remaining on a surface layer are generally removed by wiping, or the like, not only it is difficult to wipe off graffiti but also the surface layer may be injured.

3 Claims, 1 Drawing Sheet

GRAFFITI REMOVING METHOD

BACKGROUND OF THE INVENTION

The present invention relates to a novel method for removing graffiti written on a surface of a structure, that is, for example, on an outer surface of a road structure such as a bridge pier, a girder, or the like, on an inner surface of a tunnel, on an inner or outer surface of a building, on a surface of an equipment incidental to a road such as a pole, a guard-rail, or the like, etc.

Impudent persons may often write graffiti on a surface of a structure. Generally, graffiti may be written with lacquer spray or oil marker.

Wiping off graffiti with a piece of cloth impregnated with a paint thinner is one method for removing graffiti. Much labor and time are, however, required for the work of wiping off graffiti. Furthermore, it is very difficult to wipe off graffiti thoroughly. In addition, in the work of wiping off graffiti, there is a risk that the surface layer may be injured.

Recently, therefore, there has been proposed a method in which a graffiti-resistant coating composition is applied in advance onto a surface of a base material of a structure to form a surface layer so that graffiti can be hardly written on the surface layer or graffiti can be wiped off easily even in the case where graffiti are written on the surface layer (for example, as disclosed in JP-A-5-33142, JP-A-8-151540 and JP-A-9-100445).

By such a proposed method, however, it is still difficult to remove graffiti thoroughly so that graffiti may remain on the surface layer. If graffiti remain, the work of wiping off graffiti or the like, is required after all. This work is not easy as described above. Furthermore, there arises a problem that the surface layer may be injured.

SUMMARY OF THE INVENTION

It is therefore an object of the present invention to provide a graffiti removing method using a novel idea instead of the conventional idea of wiping off graffiti.

In order to achieve the above object, according to the present invention, provided is a graffiti removing method comprising the steps of: applying a solvent condensation type silicone resin coating composition having water repellency onto a surface of a base material of a structure through a primer layer to form an adhesion-resistant surface layer on the primer layer; applying a releasable coating composition onto the surface layer to form a releasable layer, after graffiti are written onto the surface layer; and releasing the releasable layer from the surface layer after the releasable layer is hardened to thereby remove the graffiti together with the releasable layer from the surface of the surface layer.

In the method, preferably, the releasable coating composition exhibits physical properties of an extensibility not smaller than 100% at 20° C. and a tensile strength not smaller than 100 kg/cm$^2$ at 20° C. after the releasable coating composition is hardened. Incidentally, it is a matter of course that the physical properties of the releasable coating composition is not limited to the above-mentioned values.

DESCRIPTION OF THE PREFERRED EMBODIMENT

An embodiment of the present invention will be described below with reference to FIGS. 1 through 3.

Figure 1:
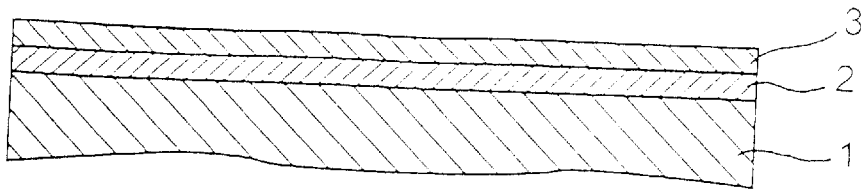
FIG. 1 is a sectional view showing a state in which a surface layer is formed, through a primer layer, on a surface of a base material of a structure.

FIG. 1 is a sectional view showing a state in which a surface layer is formed, through a primer layer, on a surface of a base material of a structure; FIG. 2 is a sectional view showing a state in which a releasable layer is formed on the surface layer having graffiti written thereon; and FIG. 3 is a sectional view showing a state in which the graffiti are removed from the surface layer by peeling the releasable layer therefrom. In the drawings, the respective layers and graffiti are expressed exaggeratingly in thickness for convenience of description. In the drawings, the reference numeral 1 designates a base material; 2, a primer layer; 3, a surface layer; 4, graffiti; and 5, a releasable layer.

In FIG. 1, the primer layer 2 is formed on the surface of the base material 1 of a structure. Examples of the surface of the base material include concrete surfaces, various steel plate surfaces, and various coating surfaces such as a degradation coating surface, a frame color tile surface, etc. The reason why the primer layer 2 is formed on the surface of the base material 1 is to correct the unevenness of the surface of the base material 1 and enhance the adhesion of the base material 1 to the surface layer 3.

In this embodiment, if an acrylic silicon resin coating composition is used for forming the primer layer 2, the surface layer 3 and the base material 1 are firmly integrated through the primer layer 2 because the acrylic silicone resin coating composition has good affinity to the solvent condensation type silicone resin coating composition forming the surface layer 3.

The acrylic silicone resin coating composition may be obtained by: a reaction among hydroxyl-group containing silicone resin, acrylic polyol resin, and isocyanate resin; a reaction between silicone-denatured acrylic polyol and isocyanate resin; a reaction between alkoxysilyl-group containing acrylic resin and water contained in air; or the like.

Incidentally, the coating composition forming the primer layer 2 is not limited to the acrylic silicone resin coating composition, but any coating composition may be used so long as the coating composition has good affinity to the surface layer 3.

After the primer layer 2 is formed, the solvent condensation silicone resin coating composition having water repellency is applied onto the primer layer 2 to form an adhesion-resistant surface layer 3.

Although there has been the case where a solvent condensation type silicone resin is used for forming the surface layer 3, a solvent condensation type silicone resin having water repellency is used in the present invention in order to enhance releasability of graffiti sprayed with lacquer, or the like, on the surface layer 3.

The solvent condensation type silicone resin coating composition having water repellency is obtained by addition of a water repel ant such as fluorosilane, or the like, to a solvent condensation type silicone resin coating composition. Typical examples of the water repellant include fluoroalkylsilane, fluoroalkyl-denatured silicone oil, fluorinated aromatic compounds, fluorinated pitch, etc. The solvent condensation type silicone resin is obtained by condensation of terminal silanol-group containing methyl hydrodiene polysiloxane, methyl methoxysilane, dimethyl polysiloxane, or the like, under the presence of a catalyst such as organic tin, or the like. Dimethyl polysiloxane is used for treating a surface of a release tape, or the like, because it is excellent in releasability.

As described above, the surface layer 3 is applied onto the surface of the base material 1 of the structure through the primer layer 2. Graffiti written on the surface layer 3 are removed easily as follows.

Figure 2:
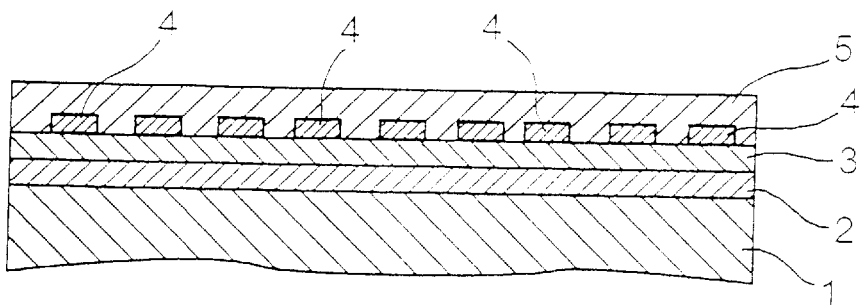
FIG. 2 is a sectional view showing a state in which a separable layer is formed on the surface layer having graffiti written thereon.

In FIG. 2, after graffiti are written on the surface layer 3, a releasable coating composition is applied onto the surface layer 3 containing the graffiti to form a releasable layer 5.

The releasable coating composition is required to have physical properties in which a coating film excellent in releasability at all times of the year is formed so that graffiti written on the surface layer 3 with lacquer, or the like, are deposited on the coating film. An example of the releasable coating composition having the aforementioned physical properties is a resin type coating composition. Preferably, the releasable coating composition exhibits the physical properties of an extensibility not lower than 100% and a tensile strength not smaller than 100 kg/cm$^2$ at 20° C. after the releasable layer 5 is hardened. Examples of the resin used include an acrylic resin, an urethane resin, an epoxy resin, a polyester resin, a silicone resin, etc. Each of these resins may contain a solvent or water.

Figure 3:
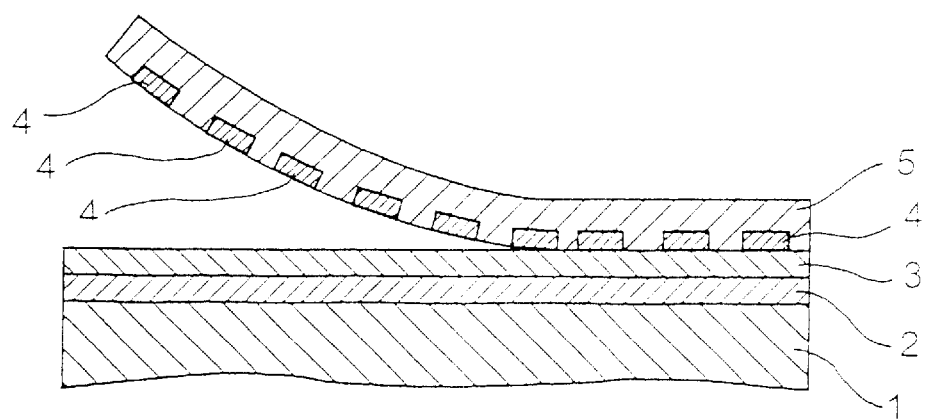
FIG. 3 is a sectional view showing a state in which the graffiti are removed from the surface layer by peeling the releasable layer therefrom.

After the releasable layer 5 formed on the surface layer 3 is hardened, the releasable layer 5 is peeled gradually from the surface layer 3 as shown in FIG. 3. Because the surface layer 3 has water repellency as well as adhesion-resistant property whereas the releasable layer 5 has releasability, the releasable layer 5 can be peeled easily from the surface layer 3. At the same time, graffiti 4 are removed from the surface layer 3 because they are deposited on the releasable layer 5. When the releasable layer 5 has the aforementioned physical properties, the releasable layer 5 is rich both in flexibility and in tensile force. Accordingly, there is no risk of breaking the releasable layer 5 in the middle of peeling of the releasable layer 5 from the surface layer 3. Accordingly, the whole of the releasable layer 5 can be peeled easily from the surface layer 3. At the same time, graffiti can be removed from the surface layer 3. Furthermore, the surface layer 3 is never injured because the releasable layer 5 is merely peeled from the surface layer 3.

EXAMPLE 1

Table 1 shows effects of materials used for writing graffiti with respect to the easiness of removal of graffiti written on the surface layer.

TABLE 1

Graffiti Removing Property of Releasable Layer

| | Solvent condensation type silicone resin coating composition having water repellency | Acrylic urethane resin coating composition |
|---|---|---|
| Lacquer spray | | x |
| Oil marker | | x |

Evaluation of graffiti removal-- : good, x: bad

In this example, a surface layer formed by application of a solvent condensation type silicone resin coating composition having water repellency and a surface layer formed by application of an acrylic urethane coating composition which was a general weather-resistant final coating material, were prepared. Graffiti were written on the prepared surface layers with lacquer spray and with oil marker respectively. After graffiti were written, a releasable coating composition was applied onto each surface layer to form a releasable layer. The releasable layer was peeled from the surface layer so that graffiti removing property was evaluated.

In either case of lacquer spray and oil marker, graffiti written on the surface layer formed of a solvent condensation type silicone resin coating composition having water repellency were removed well. On the contrary, graffiti written on the surface layer formed of an acrylic urethane resin coating composition were not removed well because the releasability of the releasable layer from the surface layer was so poor that the releasable layer as well as graffiti could not be released from the surface layer sufficiently.

As a result, it was proved that graffiti written on the surface layer formed of a solvent condensation type silicone resin coating composition having water repellency could be removed easily because not only the graffiti could be deposited on the releasable layer easily but also the releasable layer could be released from the surface layer easily.

EXAMPLE 2

Table 2 shows the physical properties of each hardened releasable coating composition for forming a releasable layer and efficiency in the work of removing graffiti.

TABLE 2

Physical Properties of Releasable Coating Composition after Hardening and Graffiti Removing Characteristic thereof

| | | Tensile strength of coating composition (kg/cm$^2$) | | | |
|---|---|---|---|---|---|
| | | 5 | 50 | 100 | 150 |
| Extensibility of coating composition | 5 | x | x | x | x |
| | 50 | x | Δ | Δ | Δ |
| | 100 | x | Δ | | |
| | 150 | x | Δ | | |

: good, Δ: usual, x: bad

As a result, it was found that the efficiency in the work of removing graffiti was very good when the releasable layer formed of a releasable coating composition exhibited the physical properties of an extensibility not lower than 100% and a tensile strength not smaller than 100 kg/cm$^2$ after the releasable layer was hardened The present invention having such a configuration as described above has the following effects.

According to an aspect of the present invention, a surface layer is formed of a solvent condensation type silicone resin coating composition having water repellency and a releasable coating composition is applied onto the surface layer to form a releasable layer after graffiti are written on the surface layer. Accordingly, when the releasable layer is released from the surface layer after the releasable layer is hardened, the graffiti can be removed easily without injury of the surface layer because the graffiti are deposited on the releasable layer.

According to another aspect of the present invention, the releasable layer is formed of a releasable coating composition which exhibits the physical properties of an extensibility not lower than 100% and a tensile strength not smaller than 100 kg/cm² at 20° C. after the releasable coating composition is hardened. Accordingly, the releasable layer is rich both in flexibility and in tensile force, so that there is no risk of breaking the releasable layer in the middle of releasing of the releasable layer from the surface layer. Accordingly, working efficiency is very good.

The present invention has the aforementioned excellent effects.

What is claimed is:

1. A method for facilitating removal of graffiti from a structure which comprises providing a structure having a base material; said base material having a primer layer adhered thereto and an adhesion resistant surface layer adhered to said primer layer whereby any graffiti written on said structure will be in contact with said adhesion resistant surface layer for easy removal therefrom;

said removal of graffiti from said adhesion resistant surface being effected by applying a releasable coating composition onto said adhesion resistant surface layer having said graffiti thereon; hardening said releasable coating layer to form a hardened releasable coating layer whereby said graffiti becomes adhered to said hardened releasable coating layer; and then removing said releasable coating with said graffiti adhered thereto;

with the proviso that said adhesion resistant surface layer is a solvent condensation type silicone resin coating composition having water repellency.

2. A graffiti removing method according to claim 1, wherein said releasable coating composition exhibits physical properties of an extensibility not smaller than 100% (at 20° C.) and a tensile strength not smaller than 100 kg/cm² (at 20° C.) after said releasable coating composition is hardened.

3. A method for removing graffiti from a structure, said structure comprising a base material, a primer layer adhered to said base material and an adhesion resistant surface layer adhered to said primer layer whereby said graffiti is on said surface resistant layer; wherein said method comprises applying a releasable coating composition onto said adhesion resistant surface layer having said graffiti thereon; hardening said releasable coating layer to form a hardened releasable coating layer whereby said graffiti becomes adhered to said hardened releasable coating layer; and then removing said releasable coating with said graffiti adhered thereto;

with the proviso that said adhesion resistant surface layer is a solvent condensation type silicone resin coating composition having water repellency.

* * * * *